US007799261B2

(12) United States Patent
Orr et al.

(10) Patent No.: US 7,799,261 B2
(45) Date of Patent: Sep. 21, 2010

(54) NEEDLE-TO-NEEDLE ELECTROSPINNING

(75) Inventors: David E. Orr, Lafayette, IN (US); William F. Moore, Bloomington, IN (US)

(73) Assignees: Cook Incorporated, Bloomington, IN (US); MED Institute, West Lafayette, IN (US)

( * ) Notice: Subject to any disclaimer, the term of this patent is extended or adjusted under 35 U.S.C. 154(b) by 58 days.

(21) Appl. No.: 12/274,530

(22) Filed: Nov. 20, 2008

(65) Prior Publication Data

US 2009/0142505 A1 Jun. 4, 2009

Related U.S. Application Data

(60) Provisional application No. 60/991,365, filed on Nov. 30, 2007.

(51) Int. Cl.
*B29C 67/00* (2006.01)

(52) U.S. Cl. ........................ 264/441; 427/471; 118/622

(58) Field of Classification Search ................. 264/441; 427/471; 118/621, 622
See application file for complete search history.

(56) References Cited

U.S. PATENT DOCUMENTS

| | | | | |
|---|---|---|---|---|
| 6,306,424 | B1 | 10/2001 | Vyakarnam et al. | |
| 6,616,435 | B2 | 9/2003 | Lee et al. | |
| 6,638,621 | B2 | 10/2003 | Anderson | |
| 6,685,956 | B2 | 2/2004 | Chu et al. | |
| 6,753,311 | B2 | 6/2004 | Fertala et al. | |
| 6,790,455 | B2 | 9/2004 | Chu et al. | |
| 6,821,479 | B1 | 11/2004 | Smith et al. | |
| 6,858,168 | B1 | 2/2005 | Vollrath et al. | |
| 6,936,298 | B2 | 8/2005 | Chaikof et al. | |
| 6,989,195 | B2 | 1/2006 | Anderson | |
| 7,070,836 | B2 * | 7/2006 | Czado | 427/462 |
| 7,081,622 | B2 | 7/2006 | Komeoka et al. | |
| 7,105,229 | B2 | 9/2006 | Anderson | |
| 7,105,810 | B2 | 9/2006 | Komeoka et al. | |
| 7,112,417 | B2 | 9/2006 | Vyakarnam et al. | |
| 7,134,857 | B2 | 11/2006 | Andrady et al. | |
| 7,172,765 | B2 | 2/2007 | Chu et al. | |
| 2003/0100944 | A1 | 5/2003 | Laksin et al. | |
| 2004/0037813 | A1 | 2/2004 | Simpson et al. | |
| 2004/0241436 | A1 | 12/2004 | Hsieh et al. | |
| 2005/0064168 | A1 * | 3/2005 | Dvorsky et al. | 428/292.1 |
| 2006/0085063 | A1 | 4/2006 | Shastri | |
| 2006/0195142 | A1 | 8/2006 | Shalaby | |
| 2006/0200232 | A1 | 9/2006 | Phaneuf et al. | |
| 2006/0213829 | A1 | 9/2006 | Rutledge et al. | |
| 2007/0031607 | A1 | 2/2007 | Dubson et al. | |
| 2007/0043428 | A1 | 2/2007 | Jennings et al. | |
| 2007/0087027 | A1 | 4/2007 | Greenhalgh et al. | |
| 2007/0162110 | A1 | 7/2007 | Dave | |

* cited by examiner

*Primary Examiner*—Christina Johnson
*Assistant Examiner*—Galen Hauth
(74) *Attorney, Agent, or Firm*—Brinks Hofer Gilson & Lione

(57) ABSTRACT

The disclosure relates to a method and apparatus for coating a medical device. The method includes providing an electrospinning apparatus and simultaneously electrospinning at least one solution onto a first surface and an opposing second surface. The apparatus comprises a first spinneret and a second spinneret. An energy source is electrically coupled to the first spinneret and the second spinneret. The first spinneret and second spinneret comprise a reservoir and an orifice fluidly coupled to the reservoir. The first spinneret orifice is located substantially opposite the second spinneret orifice.

5 Claims, 5 Drawing Sheets

NEEDLE-TO-NEEDLE ELECTROSPINNING

PRIORITY CLAIM

This application claims the benefit of provisional U.S. Patent Application Ser. No. 60/991,365, filed Nov. 30, 2007, which is incorporated herein by reference in its entirety.

BACKGROUND OF THE DISCLOSURE

A variety of medical conditions are treated, at least in part, by inserting a medical device into the body of an afflicted patient. For example, a stent may be used to prevent vessel occlusion, in one application, or to maintain the position of a graft used to repair tissue or disease within the body. For example, a graft may be employed to span an aneurysm within a body vessel.

Medical devices may be inserted into the body temporarily or left in the body for extended periods, even indefinitely. For example, a stent and/or graft may be implanted indefinitely within a body vessel to maintain vessel integrity, e.g., blood flow. These devices can be introduced, for example, into the esophagus, trachea, colon, biliary tract, urinary tract, vascular system or other location of a human or animal patient. For example, many treatments of the vascular system entail the introduction of a device such as a stent, catheter, balloon, wire guide, cannula, or the like, including combinations of such devices. When such devices are so used, however, body vessel walls may become damaged, possibly resulting in inflammation, thrombosis and stenosis.

To mitigate any deleterious side effects, for example thrombosis formation and stenosis, medical devices may be adapted to the biological environment in which they are used. Accordingly, medical devices may be coated with biocompatible materials. Electrostatic spinning, or "electrospinning," is one process that may be used to apply a suitable biocompatible coating or covering to a medical device.

Electrospinning is a process for creating a non-woven network of fibers using an electrically charged solution that is driven from a source to a target with an electrical field. More specifically, a solution is driven from an orifice, such as a needle. A voltage is applied to the orifice resulting in a charged solution jet or stream from the orifice to the target. The jet forms a cone shape, termed a Taylor cone, as it travels from the orifice. As the distance from the orifice increases, the cone becomes stretched until the jet splits or splays into many fibers prior to reaching the target. The fibers are extremely thin, typically in the nanometer range. The collection of fibers on the target forms a thin mesh layer of fibrous material.

Electrospinning, however, is still a manufacturing technique in need of further development and refinement.

SUMMARY

The present disclosure relates to an apparatus and method for electrospinning. Exemplary aspects of the disclosure will be described In one aspect, a method for preparing a substrate is provided. The method includes providing an electrospinning apparatus and simultaneously electrospinning at least one solution onto both a first surface and an opposing second surface.

In another aspect, a second method for preparing a medical device is provided. The method includes providing a medical device and an electrospinning apparatus. The medical device comprises a first surface and an opposing second surface. The electrospinning apparatus comprises a first spinneret and a second spinneret. The first spinneret comprises a reservoir loaded with a first solution and an orifice fluidly coupled to the reservoir. The second spinneret comprises a reservoir loaded with a second solution and an orifice fluidly coupled to the reservoir. The first spinneret orifice is located nearby the medical device first surface and the second spinneret orifice is located nearby the medical device second surface and substantially opposite the first spinneret orifice. The first solution and second solution are simultaneously electrospun onto the medical device first surface and second surface, respectively.

In a further aspect, an electrospinning apparatus is provided. The apparatus comprises a first spinneret, a second spinneret, and an energy source. The first spinneret comprises a reservoir and an orifice fluidly coupled to the reservoir. The second spinneret comprises a reservoir and an orifice fluidly coupled to the reservoir. The energy source is electrically coupled to the first spinneret and the second spinneret. The first spinneret orifice is located substantially opposite the second spinneret orifice.

Other systems, methods, features and advantages will be, or will become, apparent to one with skill in the art upon examination of the following figures and detailed description. It is intended that all such additional systems, methods, features and advantages be included within this description, be within the scope of the disclosure, and be protected by the following claims.

BRIEF DESCRIPTION OF THE DRAWINGS

The [system/medical device] may be better understood with reference to the following drawings and description. The components in the figures are not necessarily to scale, emphasis instead being placed upon illustrating the principles of the disclosure. Moreover, in the figures, like referenced numerals designate corresponding parts throughout the different views.

DETAILED DESCRIPTION

Figure 1:
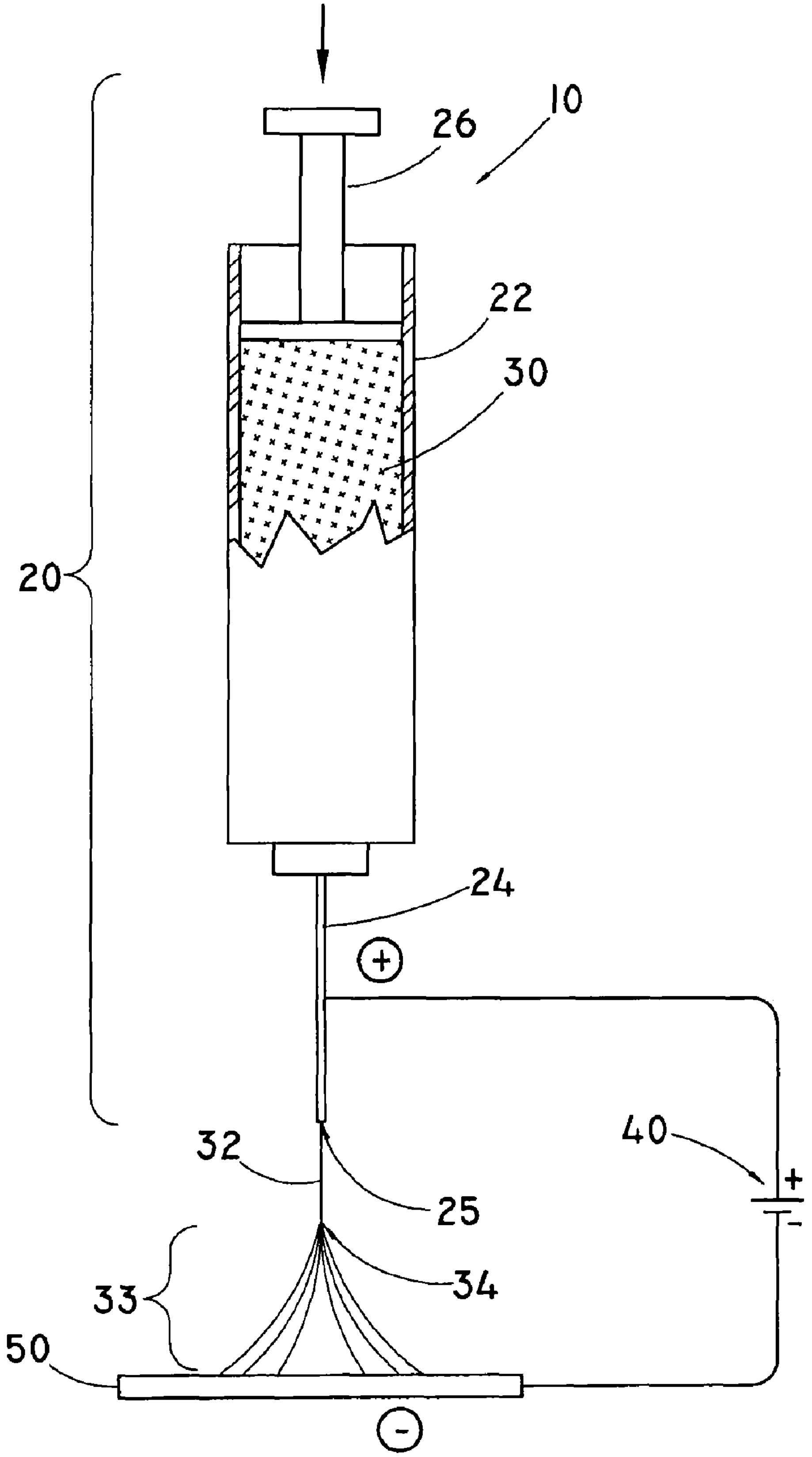
FIG. 1 is a schematic representation of an exemplary electrospinning apparatus.

The present disclosure provides a method and apparatus for coating a medical device.

Unless otherwise defined, all technical and scientific terms used herein have the same meaning as commonly understood by one of ordinary skill in the art to which this disclosure pertains. In case of conflict, the present document, including definitions, will control. Preferred methods and materials are described below, although methods and materials similar or equivalent to those described herein can be used in the practice or testing of the present disclosure. All publications, patent applications, patents and other references mentioned herein are incorporated by reference in their entirety. The materials, methods, and examples disclosed herein are illustrative only and not intended to be limiting.

Definitions

The term "body vessel" means any tube-shaped body passage lumen that conducts fluid, including but not limited to blood vessels such as those of the human vasculature system, esophageal, intestinal, billiary, urethral and ureteral passages.

The term "biocompatible" refers to a material that is substantially non-toxic in the in vivo environment of its intended use, and that is not substantially rejected by the patient's physiological system (i.e., is non-antigenic). This can be gauged by the ability of a material to pass the biocompatibility tests set forth in International Standards Organization (ISO) Standard No. 10993 and/or the U.S. Pharmacopeia (USP) 23 and/or the U.S. Food and Drug Administration (FDA) blue book memorandum No. G95-1, entitled "Use of International Standard ISO-10993, Biological Evaluation of Medical Devices Part 1: Evaluation and Testing." Typically, these tests measure a material's toxicity, infectivity, pyrogenicity, irritation potential, reactivity, hemolytic activity, carcinogenicity and/or immunogenicity. A biocompatible structure or material, when introduced into a majority of patients, will not cause a significantly adverse, long-lived or escalating biological reaction or response, and is distinguished from a mild, transient inflammation which typically accompanies surgery or implantation of foreign objects into a living organism.

The term "hydrophobic" refers to material that tends not to combine with water. One way of observing hydrophobicity is to observe the contact angle formed between a water droplet or solvent and a substrate; the higher the contact angle the more hydrophobic the surface. Generally, if the contact angle of a liquid on a substrate is greater than 90° then the material is said to be hydrophobic.

The term "implantable" refers to an ability of a medical device to be positioned, for any duration of time, at a location within a body, such as within a body vessel. Furthermore, the terms "implantation" and "implanted" refer to the positioning, for any duration of time, of a medical device at a location within a body, such as within a body vessel.

The phrase "controlled release" refers to an adjustment in the rate of release of a bioactive agent from a medical device in a given environment. The rate of a controlled release of a bioactive agent may be constant or vary with time. A controlled release may be characterized by a drug elution profile, which shows the measured rate at which the bioactive agent is removed from a drug-coated device in a given solvent environment as a function of time.

The phrase "bioactive agent" refers to any pharmaceutically active agent that results in an intended therapeutic effect on the body to treat or prevent conditions or diseases. Bioactive agents include any suitable biologically active chemical compounds, biologically derived components such as cells, peptides, antibodies, and polynucleotides, and radiochemical bioactive agents, such as radioisotopes.

An "anti-proliferative" agent/factor/drug includes any protein, peptide, chemical or other molecule that acts to inhibit cell proliferative events. Examples of anti-proliferative agents include microtubule inhibitors such as vinblastine, vincristine, colchicine and paclitaxel, or other agents such as cisplatin.

The term "pharmaceutically acceptable" refers to those compounds of the present disclosure which are, within the scope of sound medical judgment, suitable for use in contact with the tissues of humans and lower mammals without undue toxicity, irritation, and allergic response, are commensurate with a reasonable benefit/risk ratio, and are effective for their intended use, as well as the zwitterionic forms, where possible, of the compounds of the disclosure.

The term "coating," unless otherwise indicated, refers generally to material attached to an implantable medical device prior to implantation. A coating can include material covering any portion of a medical device, and can include one or more coating layers. A coating can have a substantially constant or a varied thickness and composition. Coatings can be adhered to any portion of a medical device surface, including the luminal surface, the abluminal surface, or any portions or combinations thereof.

"Pharmaceutically acceptable salt" means those salts which are, within the scope of sound medical judgment, suitable for use in contact with the tissues of humans and lower animals without undue toxicity, irritation, allergic response and the like, and are commensurate with a reasonable benefit/risk ratio. Pharmaceutically acceptable salts are well known in the art. For example, S. M. Berge et al., describe pharmaceutically acceptable salts in detail in J. Pharm Sciences, 66: 1-19 (1977), which is hereby incorporated by reference.

The term "pharmaceutically acceptable ester" refers to esters which hydrolyze in vivo and include those that break down readily in the human body to leave the parent compound or a salt thereof. Suitable ester groups include, for example, those derived from pharmaceutically acceptable aliphatic carboxylic acids, particularly alkanoic, alkenoic, cycloalkanoic and alkanedioic acids, in which each alkyl or alkenyl moiety advantageously has not more than six carbon atoms. Examples of particular esters includes formates, acetates, propionates, butyates, acrylates and ethylsuccinates.

The term "pharmaceutically acceptable prodrug" refers to those prodrugs of the compounds of the present disclosure which are, within the scope of sound medical judgment, suitable for use in contact with the tissues of humans and lower animals without undue toxicity, irritation, allergic response, and the like, commensurate with a reasonable benefit/risk ratio, and effective for their intended use, as well as the zwitterionic forms, where possible, of the compounds of the disclosure. The term "prodrug" refers to compounds that are rapidly transformed in vivo to provide the parent compound having the above formula, for example by hydrolysis in blood. A thorough discussion is provided in T. Higuchi and V. Stella, *Pro-drugs as Novel Delivery Systems*, Vol. 14 of the A.C.S. Symposium Series, and in Edward B. Roche, ed., *Bioreversible Carriers in Drug Design*, American Pharmaceutical Association and Pergamon Press, 1987, both of which are incorporated herein by reference.

Electrospinning

FIG. 1 shows an electrospinning apparatus 10 for coating an object, such as a substrate or medical device. A solution 30 is loaded into a reservoir 22, such as a syringe-like container. The reservoir 22 is fluidly coupled to an orifice 24, such as a needle, to form a spinneret 20.

The orifice 24 has a distal opening 25 through which the solution 30 is driven by a displacement system 26. The displacement system 26 may comprise any suitable controllable variable rate fluid displacement system, but is desirably an automated system to ensure consistent and accurate flow rates. For example, in FIG. 1, the displacement system 26 is represented in a simplified manner as being provided by a plunger. In one example, the fluid displacement system may deliver solution 30 at a delivery rate of about 0 mL/hr to about 25 mL/hr, of about 1 mL/hr to about 10 mL/hr, or about 3 mL/hr to about 7 mL/hr.

An electric potential 40 is established across the spinneret 20 and a target 50. In one example, the electric potential is between about 10 kV and about 35 kV, between about 15 and about 30 kV, or between about 20 kV and about 25 kV. The electric potential 40 aids the displacement system 26 and motivates the solution 30 from the orifice distal opening 25. The solution forms a charged jet or stream 32 from the distal opening 25 to the target 50. The solution stream 32 forms a cone shape 33, called a Taylor cone, between the spinneret 20 and the target 50. As the solution stream 32 travels from the opening 25, the cone 33 splays or stretches at a position 34 between the spinneret 20 and the target 50. In one example, the distance between the distal opening 25 and the target 50 is between about 0.1 inches to about 6 inches, between about 0.5 inches to about 4 inches, or between about 1 inch to about 2 inches. Position 34 need not be substantially intermediate the orifice distal opening 25 and the target 50, and may be located at any desired distance between the orifice distal opening 25 and the target 50. The splaying or stretching action creates a plurality of fibers that may or may not dry upon reaching the target, depending on the volatility of the chosen solvent.

In one example, an electrospinning apparatus may apply a coating or covering on a medical device surface. For example, in FIG. 2, a portion of a medical device 160 is placed in between a spinneret 120 and a target, such as a mandrel 150. In one example, the distance between the spinneret 120 and the medical device 160 is between about 0.1 inches to about 6 inches, between about 0.5 inches to about 4 inches, or between about 1 inch to about 2 inches. The medical device includes first surface 162, and an opposing second surface 163. For example, the first surface may be an outer surface, an exterior surface or an abluminal surface, and the opposing second surface may be an inner surface, an interior surface or a luminal surface. The mandrel 150 is located adjacent the medical device second surface 163. The spinneret 120 includes a reservoir 122 having a distal end 123 and a proximal end 124. The reservoir is loaded with solution 130 and is fluidly coupled at the reservoir distal end 123 to an orifice 125 at the orifice proximal end 126. The reservoir proximal end 124 is fluidly coupled to a displacement system 128, such as a plunger. The orifice distal end 127 is oriented in the direction of the medical device 160. For example, the orifice distal end 127 may be oriented towards the mandrel 150 such that any solution 130 exiting the orifice distal end 127 is directed towards the mandrel 150. A voltage source 140 is electrically coupled to the spinneret 120 and mandrel 150.

Figure 2:
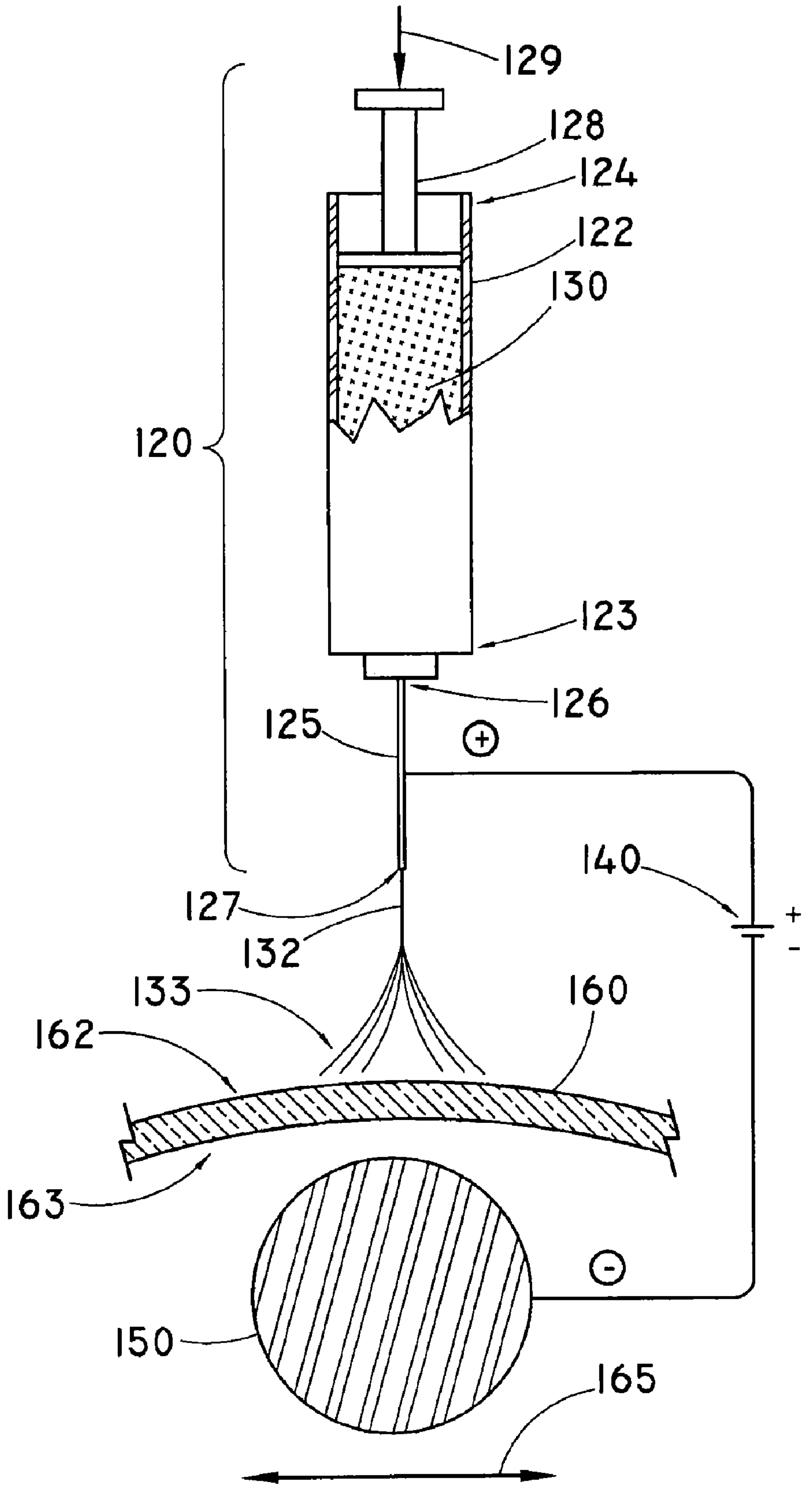
FIG. 2 is a schematic representation of an exemplary electrospinning apparatus.

Still referring to FIG. 2, the voltage source 140 generates an electric potential between the spinneret 120 and mandrel 150. In one example, the electric potential applied by the voltage source is between about 10 kV and about 35 kV, between about 15 and about 30 kV, or between about 20 kV and about 25 kV. The plunger 128 may be advanced in a distal direction 129, and may urge the solution 130 from the spinneret 120. The electric potential and plunger movement 129 may motivate the solution 130 from the spinneret 120. The solution 130 exits the orifice distal end 127 as a charged solution stream or jet 132. The solution stream 132 is directed towards the medical device first surface 162. For example, the solution stream 132 may be directed at the focused mandrel 150 located adjacent the medical device second surface 163. As the solution stream 132 travels away from the orifice distal end 127 towards the medical device 160, the solution stream 132 splays 133 before contacting the medical device first surface 162. The splaying 133 may form a plurality of fibers, such as nanofibers. The fibers contact the medical device first surface 162 to form a coating of non-woven fibers thereon. In one example, the solution 130 may have a delivery rate of about 0 mL/hr to about 25 mL/hr, of about 1 mL/hr to about 10 mL/hr, or about 3 mL/hr to about 7 mL/hr.

In another aspect, the medical device 160 may be moved relative to the spinneret 120 and/or target 150. Movement of the medical device 160 relative to the spinneret 120 and/or target 150 may permit the coating of any portion of the medical device first surface 162. For example, the first surface 162 may be coated almost entirely, partially, or at discrete locations. For example, the medical device 160 may be moved laterally 165 to direct the fibers about the horizontal length of the medical device first surface 162. The medical device 160 also may be moved vertically to direct the fibers about the vertical length (e.g., top to bottom) of the medical device 160. Alternatively, the medical device 160 may remain stationary while the spinneret 120 and/or target 150 move relative to the medical device 160.

The relative motion of the spinneret 120 and medical device 160 may influence several properties of the resulting coating of fibers. For example, if the medical device 160 is moved laterally 165, as the relative speed between the spinneret 120 and medical device 160 is increased, the thickness of the coating will be reduced, and the fibers may tend to be increasingly aligned with each other. This may affect the strength, resiliency, and porosity of the coating. If the spinneret 120 is moved relative to the target 150, for example increasing the distance between the target 150 and spinneret 120, the solution stream 132 will travel a greater distance and may affect the splaying and drying of the solution stream 132.

In another example, the spinneret orifice may be located about the medical device second surface and the focused mandrel may be located adjacent the medical device first surface. For example, the apparatus configuration of FIG. 2 may be reversed, with the orifice distal end located about the medical device second surface and the focused mandrel adjacent the medical device first surface. This configuration may permit coating or covering the medical device second surface with electrospun fibers.

In an additional aspect, an electrospinning apparatus may simultaneously apply a coating on a medical device first surface and second surface. For example, in FIG. 3, a portion of a medical device 260 is placed in between a first spinneret orifice 221 and a second spinneret orifice 271. The medical device 260 includes a first surface 262 and an opposing second surface 263. For example, the first surface may be an outer surface, an exterior surface or an abluminal surface, and the opposing second surface may be an inner surface, an interior surface or a luminal surface. The first spinneret 220 includes a reservoir 222 having a distal end 223 and a proximal end 224. The reservoir 222 is loaded with a first solution 230 and is fluidly coupled at the reservoir distal end 223 to the orifice 221, such as a needle, at the orifice proximal end 225. The reservoir proximal end 224 is fluidly coupled to a displacement system 227, such as a plunger. The first spinneret orifice distal end 226 is oriented in the direction of the medical device first surface 262. For example, the first spinneret orifice distal end 226 may be substantially oriented towards the second spinneret orifice 271 such that any solution exiting the first spinneret orifice distal end 226 is directed towards the second spinneret orifice 271. It should be noted that the first spinneret orifice distal end 226 need not be directly opposite the second spinneret orifice 271.

The second spinneret 270 includes a reservoir 272 having a distal end 273 and a proximal end 274, and is loaded with a second solution 280. The second spinneret 270 is fluidly coupled at the reservoir distal end 273 to the second spinneret orifice 271, such as a needle, at the orifice proximal end 275. The reservoir proximal end 274 is fluidly coupled to a displacement system 277, such as a plunger. The second spinneret orifice distal end 276 is oriented in the direction of the medical device second surface 263. For example, the second spinneret orifice distal end 276 may be oriented towards the first spinneret orifice 221 such that any solution 280 exiting the second spinneret orifice distal end 276 is directed towards the first spinneret orifice 221. A voltage source 240 is electrically coupled to the first spinneret 220 and second spinneret 270.

Figure 3:
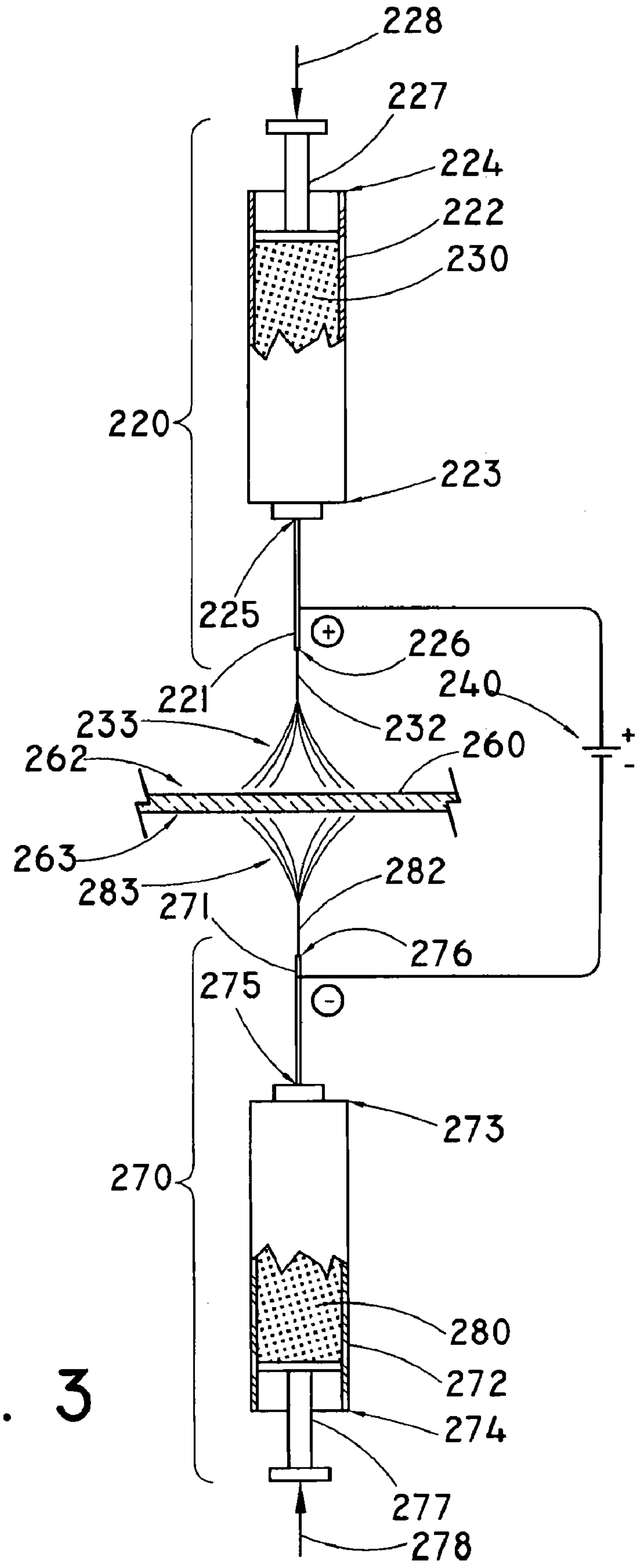
FIG. 3 is a schematic representation of an exemplary electrospinning apparatus.

Still referring to FIG. 3, the voltage source 240 generates an electric potential between the first spinneret orifice 221 and second spinneret orifice 271. In one example, the electric potential applied by the voltage source is between about 10 kV and about 35 kV, between about 15 and about 30 kV, or between about 20 kV and about 25 kV. The plungers 227, 277 of the first spinneret 220 and second spinneret 270 may be advanced 228, 278 within their respective reservoirs 222, 272, and may urge the first solution 230 and second solution 280 from the first spinneret orifice 221 and second spinneret orifice 271, respectively. The electric potential and plunger movement may motivate the first solution 230 and second solution 280 from the first spinneret orifice 221 and second spinneret orifice 271, respectively. The first solution 230 exits the first spinneret orifice distal end 226 as a first charged solution stream or jet 232. The first solution stream 232 is directed towards the medical device first surface 262. For example, the first solution stream 232 may be directed at the second spinneret orifice 271 located about the medical device second surface 263. The second solution 280 exits the second spinneret orifice distal end 276 as a second charged solution stream or jet 282. The second solution stream 282 is directed towards the medical device second surface 263. For example, the solution stream 282 may be directed at the first spinneret orifice 221 located about the medical device first surface 263. The first solution stream 232 need not be directly opposite the second solution stream 282. For example, the first solution stream 232 may be located at any distance from the second solution stream 282 SO long as a sufficient electrical attraction is maintained between the first solution stream 232 and second solution stream 282. In one example, the solutions 230, 280 may have a delivery rate of about 0 mL/hr to about 25 mL/hr, of about 1 mL/hr to about 10 mL/hr, or about 3 mL/hr to about 7 mL/hr.

As the solution streams 232, 282 travel away from their respective spinneret orifices 221, 271 in the direction of the medical device 260, the first solution stream 232 and second solution stream 282 splay 233, 283 before contacting the medical device first surface 262 and second surface 263, respectively. The splaying 233, 283 may form a plurality of fibers, such as nanofibers. The fibers contact the medical device exterior surface 263 and interior surface 262 to form a non-woven network of fibers.

In another example, an electrospinning apparatus may simultaneously apply a coating on a medical device abluminal surface and luminal surface. For example, in FIG. 4, a portion of a medical device 360 is placed intermediate a first spinneret orifice 321 and a second spinneret orifice 371. The medical device 360 includes a lumen 361 having a luminal surface 362 and abluminal surface 363. The first spinneret 320 is located nearby the medical device exterior 364 and includes a reservoir 322 having a distal end 323 and a proximal end 324. The reservoir 322 is loaded with a first solution 330 and is fluidly coupled at the reservoir distal end 323 to the orifice 321 at the orifice proximal end 325. The reservoir proximal end 324 is fluidly coupled to a displacement system 327, such as a plunger. The first spinneret orifice distal end 326 is oriented in the direction of the medical device abluminal surface 363. For example, the first spinneret orifice distal end 326 may be substantially oriented towards the second spinneret orifice 371 such that any solution exiting the first spinneret orifice distal end 326 is directed towards the second spinneret orifice 371.

The second spinneret 370 may be located nearby the medical device exterior 364 and/or in the medical device lumen 361. The second spinneret 370 includes a reservoir 372 having a distal end 373 and a proximal end 374, and is loaded with a second solution 380. The second spinneret 370 is fluidly coupled at the reservoir distal end 373 to the second spinneret orifice 371 at the orifice proximal end 375. The reservoir proximal end 374 is fluidly coupled to a displacement system 377, such as a plunger. The second spinneret orifice distal end 376 is oriented in the direction of the medical device luminal surface 362. For example, the second spinneret orifice distal end 376 may be substantially oriented towards the first spinneret orifice 321 such that any solution 380 exiting the second spinneret orifice distal end 376 is directed towards the first spinneret orifice 321. A voltage source 340 is electrically coupled to the first spinneret 320 and second spinneret 370.

Figure 4:
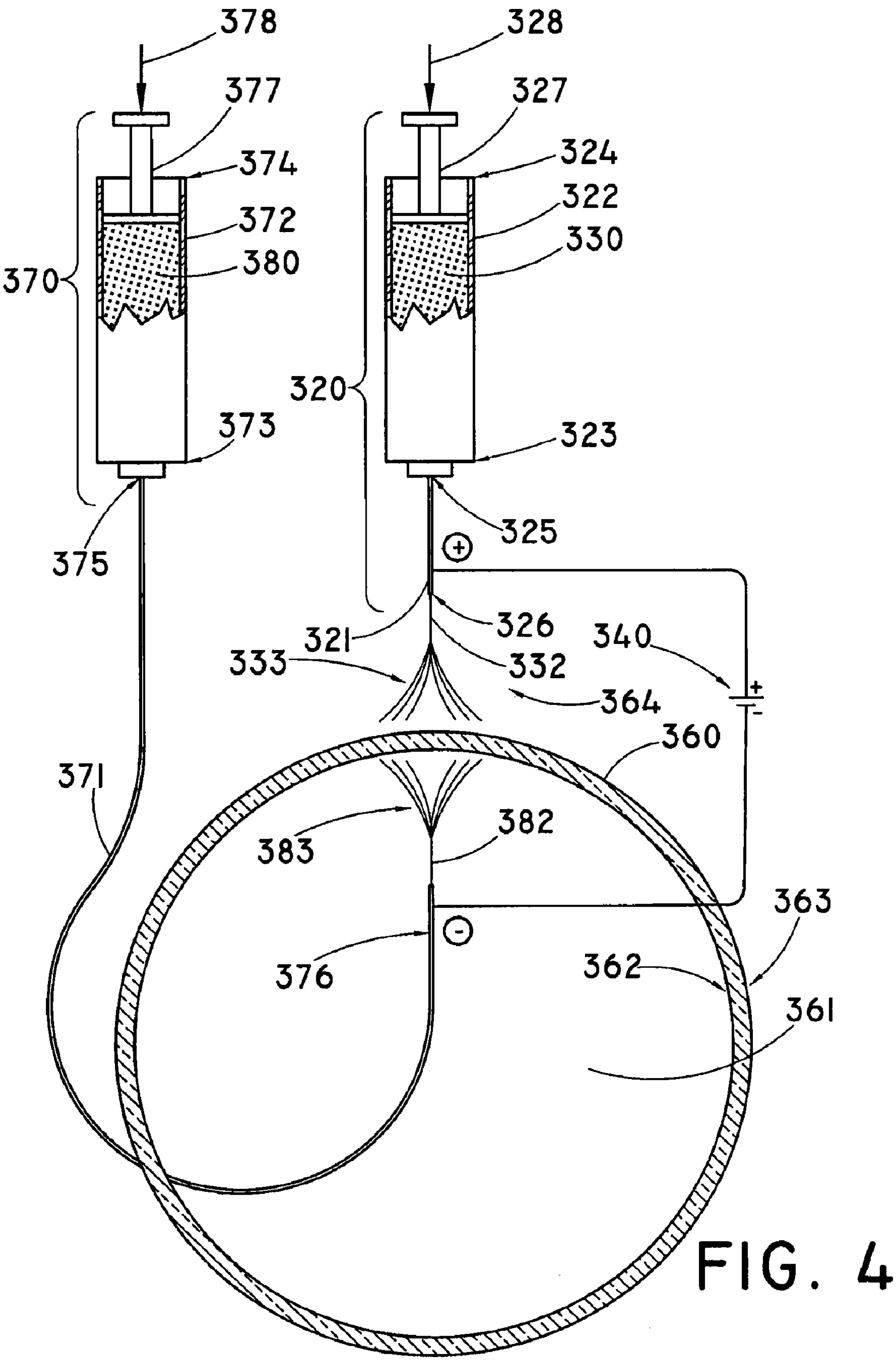
FIG. 4 is a schematic representation of an exemplary electrospinning apparatus.

Still referring to FIG. 4, the voltage source 340 generates an electric potential between the first spinneret orifice 321 and second spinneret orifice 371. In one example, the electric potential applied by the voltage source is between about 10 kV and about 35 kV, between about 15 and about 30 kV, or between about 20 kV and about 25 kV. The plungers 327, 377 of the first spinneret 320 and second spinneret 370 may be advanced 328, 378 within their respective reservoirs 322, 372, and may urge the first solution 330 and second solution 380 from the first spinneret orifice 321 and second spinneret orifice 371, respectively. In one example, the solutions 330, 380 may have a delivery rate of about 0 mL/hr to about 25 mL/hr, of about 1 mL/hr to about 10 mL/hr, or about 3 mL/hr to about 7 mL/hr. The electric potential and plunger movement may motivate the first solution 330 and second solution 380 from the first spinneret orifice 321 and second spinneret orifice 371, respectively. The first solution 330 exits the first spinneret orifice distal end 326 as a first charged solution stream or jet 332. The first solution stream 332 is directed towards the medical device abluminal surface 363. For example, the first solution stream 332 may be directed at the second spinneret orifice 371 located in the medical device lumen 361. The second solution 380 exits the second spinneret orifice distal end 376 as a second charged solution stream or jet 382. The second solution stream 382 is directed towards the medical device luminal surface 362. For example, the solution stream 382 may be directed at the first spinneret orifice 321 located about the medical device exterior 364. The first solution stream 332 need not be directly opposite the second solution stream 382. For example, the first solution stream 332 may be located at any distance from the second solution stream 382 so long as a sufficient electrical attraction is maintained between the first solution stream 232 and second solution stream 282.

As the solution streams 332, 382 travel away from their respective spinneret orifices 321, 371 in the direction of the medical device 360, the first solution stream 332 and second solution stream 382 splay 333, 383 before contacting the medical device abluminal surface 363 and luminal surface 362, respectively. The splaying 333, 383 may form a plurality of fibers, such as nanofibers. The fibers contact the medical device abluminal surface 363 and luminal surface 362 to form a non-woven network of fibers.

Figure 5A:
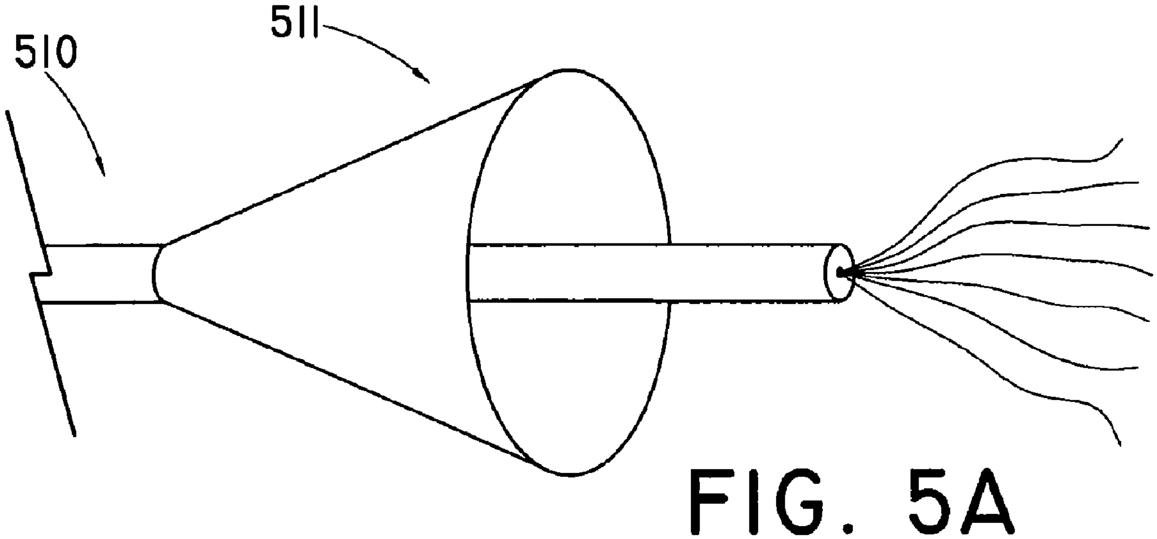
FIGS. 5A and 5B are schematic representations of exemplary spinneret configurations.
Figure 5B:
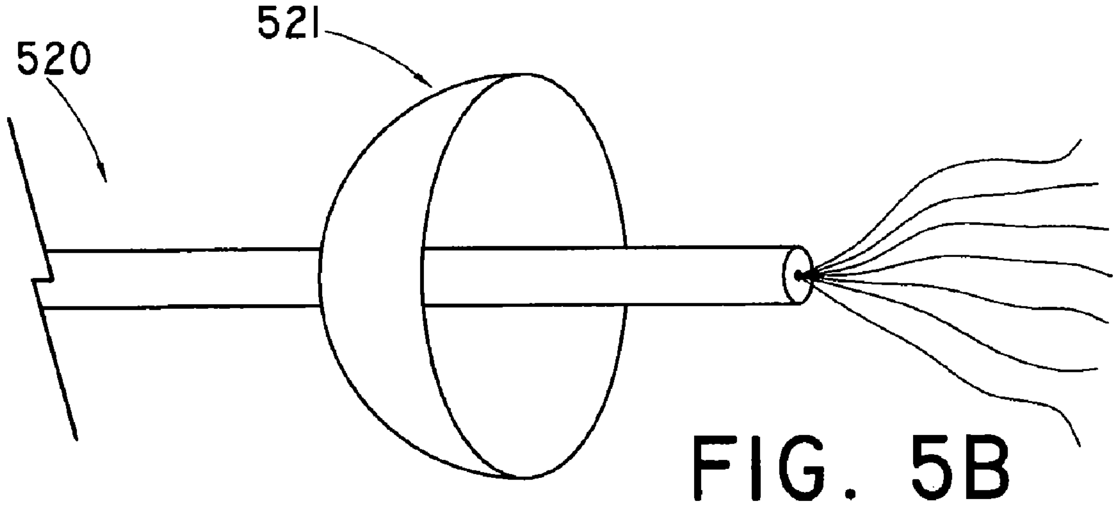

Referring further to FIGS. 1-4, the spinnerets may have any suitable configuration. For example, a spinneret may comprise a conical or hemispherical configuration. FIG. 5A depicts a spinneret 510 having a conical outer profile 511. FIG. 5B depicts a spinneret 520 having a hemispherical outer profile 521. Modification of the spinneret configuration may alter the electrical field and optimize the attractive forces upon the electrospun fibers.

Solutions

Solutions for use in the present disclosure may include any liquids containing materials to be electrospun. For example, solutions may include, but are not limited to, suspensions, emulsions, melts, and hydrated gels containing the materials, substances, or compounds to be electrospun. Solutions may further include solvents or other liquids or carrier molecules.

Materials appropriate for electrospinning may include any compound, molecule, substance, or group or combination thereof that forms any type of structure or group of structures during or after electrospinning. For example, materials may include natural materials, synthetic materials, or combinations thereof. Naturally occurring organic materials include any substances naturally found in the body of plants or other organisms, regardless of whether those materials have or can be produced or altered synthetically. Synthetic materials include any materials prepared through any method of artificial synthesis, processing, or manufacture. In one example the materials are biologically compatible materials.

One class of materials for electrospinning comprises proteins, such as extracellular matrix (ECM) proteins. ECM proteins include, but are not limited to, collagen, fibrin, elastin, laminin, and fibronectin. In one example, the protein is collagen of any type. Additional materials include further ECM components, for example proteoglycans.

Proteins, as used herein, refer to their broadest definition and encompass the various isoforms that are commonly recognized to exist within the different families of proteins and other molecules. There are multiple types of each of these proteins and molecules that are naturally occurring, as well as types that can be or are synthetically manufactured or produced by genetic engineering. For example, collagen occurs in many forms and types and all of these types and subsets are encompassed herein.

The term protein, and any term used to define a specific protein or class of proteins further includes, but is not limited to, fragments, analogs, conservative amino acid substitutions, non-conservative amino acid substitutions and substitutions with non-naturally occurring amino acids with respect to a protein or type or class of proteins. For example, the term collagen includes, but is not limited to, fragments, analogs, conservative amino acid substitutions, and substitutions with non-naturally occurring amino acids or residues with respect to any type or class of collagen. The term "residue" is used herein to refer to an amino acid (D or L) or an amino acid mimetic that is incorporated into a protein by an amide bond. As such, the residue can be a naturally occurring amino acid or, unless otherwise limited, can encompass known analogs of natural amino acids that function in a manner similar to the naturally occurring amino acids (i.e., amino acid mimetics).

Furthermore, as discussed above, individual substitutions, deletions or additions which alter, add or delete a single amino acid or a small percentage of amino acids (preferably less than 10%, more preferably less than 5%) in an encoded sequence are conservatively modified variations where the alterations result in the substitution of an amino acid with a chemically similar amino acid.

It is to be understood that the term protein, polypeptide or peptide further includes fragments that may be 90% to 95% of the entire amino acid sequence, as well as extensions to the entire amino acid sequence that are 5% to 10% longer than the amino acid sequence of the protein, polypeptide or peptide.

In one example, the solution may comprise synthetic materials, such as biologically compatible synthetic materials. For example, synthetic materials may include polymers. Such polymers include but are not limited to the following: poly(urethanes), poly(siloxanes) or silicones, poly(ethylene), poly(vinyl pyrrolidone), poly(2-hydroxy ethyl methacrylate), poly(N-vinyl pyrrolidone), poly(methyl methacrylate), poly(vinyl alcohol), poly(acrylic acid), polyacrylamide, poly(ethylene-co-vinyl acetate), poly(ethylene glycol), poly(methacrylic acid), polylactides (PLA), polyglycolides (PGA), poly(lactide-co-glycolid-es) (PLGA), polyanhydrides, and polyorthoesters or any other similar synthetic polymers that may be developed that are biologically compatible. Biologically compatible synthetic polymers further include copolymers and blends, and any other combinations of the forgoing either together or with other polymers generally. The use of these polymers will depend on given applications and specifications required.

Solutions may also include electrospun materials that are capable of changing into different materials during or after electrospinning. For example, procollagen will form collagen when combined with procollagen peptidase. Procollagen, procollagen peptidase, and collagen are all within the definition of materials. Similarly, the protein fibrinogen, when combined with thrombin, forms fibrin. Fibrinogen or thrombin that are electrospun as well as the fibrin that later forms are included within the definition of materials.

Solutions may comprise any solvent that allows delivery of the material or substance to the orifice, tip of a syringe, or other site from which the material will be electrospun. The solvent may be used for dissolving or suspending the material or the substance to be electrospun. For example, solvents used for electrospinning have the principal role of creating a mixture with collagen and/or other materials to be electrospun, such that electrospinning is feasible.

The concentration of a given solvent is often an important consideration in electrospinning. In electrospinning, interactions between molecules of materials stabilize the solution stream, leading to fiber formation. The solvent should sufficiently dissolve or disperse the polymer to prevent the solution stream from disintegrating into droplets and should thereby allow formation of a stable stream in the form of a fiber. In one example, the solution has a concentration of about 0.005 g/mL to about 0.15 g/mL, about 0.01 g/mL to about 0.12 g/mL, or about 0.04 g/mL to about 0.09 g/mL.

Solvents useful for dissolving or suspending a material or a substance depend on the material or substance. For example, collagen can be electrodeposited as a solution or suspension in water, 2,2,2-trifluoroethanol, 1,1,1,3,3,3-hexafluoro-2-propanol (also known as hexafluoroisopropanol or HFIP), or combinations thereof. Fibrin monomer can be electrospun from solvents such as urea, monochloroacetic acid, water, 2,2,2-trifluoroethanol, HFIP, or combinations thereof. Elastin can be electrodeposited as a solution or suspension in water, 2,2,2-trifluoroethanol, isopropanol, HFIP, or combinations thereof, such as isopropanol and water.

Other lower order alcohols, especially halogenated alcohols, may be used. Additional solvents that may be used or combined with other solvents include acetamide, N-methylformamide, N,N-dimethylformamide (DMF), dimethylsulfoxide (DMSO), dimethylacetamide, N-methyl pyrrolidone (NMP), acetic acid, trifluoroacetic acid, ethyl acetate, acetonitrile, trifluoroacetic anhydride, 1,1,1-trifluoroacetone, maleic acid, hexafluoroacetone.

Proteins and peptides associated with membranes are often hydrophobic and thus do not dissolve readily in aqueous solutions. Such proteins can be dissolved in organic solvents such as methanol, chloroform, and trifluoroethanol (TFE) and emulsifying agents. Any other solvents may be used, for example, solvents useful in chromatography, especially high performance liquid chromatography. Proteins and peptides are also soluble, for example, in HFIP, hexafluoroacetone, chloroalcohols in conjugation with aqueous solutions of mineral acids, dimethylacetamide containing 5% lithium chloride, and in acids such as acetic acid, hydrochloric acid and formic acid. In some aspects, the acids are very dilute, in others the acids are concentrated. N-methyl morpholine-N-oxide is another solvent that can be used with many polypeptides. Other compounds, used either alone or in combination with organic acids or salts, include the following: triethanolamine; dichloromethane; methylene chloride; 1,4-dioxane; acetonitrile; ethylene glycol; diethylene glycol; ethyl acetate; glycerine; propane-1,3-diol; furan; tetrahydrofuran; indole; piperazine; pyrrole; pyrrolidone; 2-pyrrolidone; pyridine; quinoline; tetrahydroquinoline; pyrazole; and imidazole. Combinations of solvents may also be used.

Synthetic polymers may be electrospun from, for example, HFIP, methylene chloride, ethyl acetate; acetone, 2-butanone (methyl ethyl ketone), diethyl ether; ethanol; cyclohexane; water; dichloromethane (methylene chloride); tetrahydrofuran; dimethylsulfoxide (DMSO); acetonitrile; methyl formate and various solvent mixtures. HFIP and methylene chloride are desirable solvents. Selection of a solvent will depend upon the characteristics of the synthetic polymer to be electrodeposited.

Selection of a solvent, for example, is based in part on consideration of secondary forces that stabilize polymer-polymer interactions and the solvent's ability to replace these with strong polymer-solvent interactions. In the case of polypeptides such as collagen, and in the absence of covalent crosslinking, the principal secondary forces between chains are: (1) coulombic, resulting from attraction of fixed charges on the backbone and dictated by the primary structure (e.g., lysine and arginine residues will be positively charged at physiological pH, while aspartic or glutamic acid residues will be negatively charged); (2) dipole-dipole, resulting from interactions of permanent dipoles; the hydrogen bond, commonly found in polypeptides, is the strongest of such interactions; and (3) hydrophobic interactions, resulting from association of non-polar regions of the polypeptide due to a low tendency of non-polar species to interact favorably with polar water molecules. Solvents or solvent combinations that can favorably compete for these interactions can dissolve or disperse polypeptides. For example, HFIP and TFE possess a highly polar OH bond adjacent to a very hydrophobic fluorinated region. Additionally, the hydrophobic portions of these solvents can interact with hydrophobic domains in polypeptides, helping to resist the tendency of the latter to aggregate via hydrophobic interactions. In some examples, solvents are selected based on their tendency to induce helical structure in electrospun protein fibers, thereby predisposing monomers of collagen or other proteins to undergo polymerization and form helical polymers that mimic the native collagen fibril. Examples of such solvents include halogenated alcohols, preferably fluorinated alcohols (HFIP and TFE) hexafluoroacetone, chloroalcohols in conjugation with aqueous solutions of mineral acids and dimethylacetamide, preferably containing lithium chloride. HFIP and TFE are especially preferred. In some examples, water is added to the solvents.

The solvent, moreover, may have a relatively high vapor pressure to promote the stabilization of an electrospinning solution stream to create a fiber as the solvent evaporates. In examples involving higher boiling point solvents, it is often desirable to facilitate solvent evaporation by warming the spinning solution, and optionally the solution stream itself, or by electrospinning in reduced atmospheric pressure.

Bioactive Agents

In one example, a solution for electrospinning may further comprise bioactive materials, for example a therapeutically effective amount of one or more bioactive agents in pure form or in derivative form. Preferably, the derivative form is a pharmaceutically acceptable salt, ester or prodrug form. Alternatively, a medical device may be implanted in combination with the administration of a bioactive agent from a catheter positioned within the body near the medical device, before, during or after implantation of the device.

Bioactive agents that may be used in the present disclosure include, but are not limited to, pharmaceutically acceptable compositions containing any of the bioactive agents or classes of bioactive agents listed herein, as well as any salts and/or pharmaceutically acceptable formulations thereof.

The bioactive agent may be coated on any suitable part of the medical device. Selection of the type of bioactive agent and the portions of the medical device comprising the bioactive agent may be chosen to perform a desired function upon implantation. For example, the bioactive agent may be selected to treat indications such as coronary artery angioplasty, renal artery angioplasty, carotid artery surgery, renal dialysis fistulae stenosis, or vascular graft stenosis.

The bioactive agent may be selected to perform one or more desired biological functions. For example, the abluminal surface of the medical device may comprise a bioactive agent selected to promote the ingrowth of tissue from the interior wall of a body vessel, such as a growth factor. An anti-angiogenic or antineoplastic bioactive agent such as paclitaxel, sirolimus, or a rapamycin analog, or a metalloproteinase inhibitor such as batimastaat may be coated on the medical device to mitigate or prevent undesired conditions in the vessel wall, such as restenosis. Many other types of bioactive agents can be coated on the medical device.

Bioactive agents for use in electrospinning solutions of the present disclosure include those suitable for coating an implantable medical device. The bioactive agent can include, for example, one or more of the following: antiproliferative agents (sirolimus, paclitaxel, actinomycin D, cyclosporine), immunomodulating drugs (tacrolimus, dexamethasone), metalloproteinase inhibitors (such as batimastat), antisclerosing agents (such as collagenases, halofuginone), prohealing drugs (nitric oxide donors, estradiols), mast cell inhibitors and molecular interventional bioactive agents such as c-myc antisense compounds, thromboresistant agents, thrombolytic agents, antibiotic agents, anti-tumor agents, antiviral agents, anti-angiogenic agents, angiogenic agents, anti-mitotic agents, anti-inflammatory agents, angiostatin agents, endostatin agents, cell cycle regulating agents, genetic agents, including hormones such as estrogen, their homologs, derivatives, fragments, pharmaceutical salts and combinations thereof. Other useful bioactive agents include, for example, viral vectors and growth hormones such as Fibroblast Growth Factor and Transforming Growth Factor-β.

Medical devices comprising an antithrombogenic bioactive agent are particularly preferred for implantation in areas of the body that contact blood. For example, an antithromogenic bioactive agent can be coated on the medical device surface. An antithrombogenic bioactive agent is any bioactive agent that inhibits or prevents thrombus formation within a body vessel. The medical device may comprise any suitable antithrombogenic bioactive agent. Types of antithrombotic bioactive agents include anticoagulants, antiplatelets, and fibrinolytics. Anticoagulants are bioactive agents which act on any of the factors, cofactors, activated factors, or activated cofactors in the biochemical cascade and inhibit the synthesis of fibrin. Antiplatelet bioactive agents inhibit the adhesion, activation, and aggregation of platelets, which are key components of thrombi and play an important role in thrombosis. Fibrinolytic bioactive agents enhance the fibrinolytic cascade or otherwise aid in dissolution of a thrombus. Examples of antithrombotics include but are not limited to anticoagulants such as thrombin, Factor Xa, Factor VIIa and tissue factor inhibitors; antiplatelets such as glycoprotein IIb/IIIa, thromboxane A2, ADP-induced glycoprotein IIb/IIIa, and phosphodiesterase inhibitors; and fibrinolytics such as plasminogen activators, thrombin activatable fibrinolysis inhibitor (TAFI) inhibitors, and other enzymes which cleave fibrin.

Further examples of antithrombotic bioactive agents include anticoagulants such as heparin, low molecular weight heparin, covalent heparin, synthetic heparin salts, coumadin, bivalirudin (hirulog), hirudin, argatroban, ximelagatran, dabigatran, dabigatran etexilate, D-phenalanyl-L-poly-L-arginyl, chloromethyl ketone, dalteparin, enoxaparin, nadroparin, danaparoid, vapiprost, dextran, dipyridamole, omega-3 fatty acids, vitronectin receptor antagonists, DX-9065a, Cl-1083, JTV-803, razaxaban, BAY 59-7939, and LY-51, 7717; antiplatelets such as eftibatide, tirofiban, orbofiban, lotrafiban, abciximab, aspirin, ticlopidine, clopidogrel, cilostazol, dipyradimole, nitric oxide sources such as sodium nitroprussiate, nitroglycerin, S-nitroso and N-nitroso compounds; fibrinolytics such as alfimeprase, alteplase, anistreplase, reteplase, lanoteplase, monteplase, tenecteplase, urokinase, streptokinase, or phospholipid encapsulated microbubbles; and other bioactive agents such as endothelial progenitor cells or endothelial cells.

Also particularly preferred are solutions comprising a thrombolytic bioactive agent. Desirably, the thrombolytic bioactive agent is coated on the luminal surface of the medical device. Thrombolytic agents are used to dissolve blood clots that may adversely affect blood flow in body vessels. A thrombolytic agent is any therapeutic agent that either digests fibrin fibers directly or activates the natural mechanisms for doing so. The medical device can comprise any suitable thrombolytic agent. Examples of commercial thrombolytics, with the corresponding active agent in parenthesis, include, but are not limited to, Abbokinase (urokinase), Abbokinase Open-Cath (urokinase), Activase (alteplase, recombinant), Eminase (anistreplase), Retavase (reteplase, recombinant), and Streptase (streptokinase). Other commonly used names are anisoylated plasminogen-streptokinase activator complex; APSAC; tissue-type plasminogen activator (recombinant); t-PA; rt-PA.

The configuration of the bioactive agent on the medical device will depend in part on the desired rate of elution for the bioactive agent(s). For example, bioactive agents may be incorporated in the medical device by: 1) mixing a bioactive agent with a solution prior to spinning the solution; 2) using two spinnerets to spin a polymer and a bioactive agent separately and simultaneously, 3) impregnating a spun polymer with a bioactive agent, and 4) electrospinning a solution over the top of a bioactive agent coated medical device.

In one example, a bioactive agent may be admixed with a solution comprising polymers and/or proteins. Electrospinning the resulting solution yields fibers that contain the desired bioactive agents. This method may be particularly suited to creating fibers that are not susceptible to being rejected by the body. Additionally, the fibers may later be melted, compressed, or otherwise manipulated, thereby changing or eliminating the interstices between the fibers, without reducing the drug content of the fibers.

In a second example, two spinnerets may be used in close proximity to each other, each having a common target. A first spinneret may be loaded with a solution comprising polymers and the second spinneret may be loaded with a solution comprising at least one bioactive agent. The spinnerets are charged and their solutions are spun simultaneously at the common target, creating a material that includes polymer fibers and bioactive agent fibers. The bioactive agent being fed into the second spinneret may also be mixed with a second polymer to improve the spin characteristics of the bioactive agent.

In another example, a solution may be electrospun onto a medical device incorporating a bioactive agent. For example, the medical device may be initially coated with a bioactive agent in any suitable manner. The medical device may then be coated by electrospinning a solution, such that the electrospun solution creates a non-woven network of fibers that at least partially overlays the bioactive agent previously deposited on the medical device. The bioactive agent may be deposited on the medical device in any suitable manner. For example, the coating may be deposited onto the medical device by spraying, dipping, pouring, pumping, brushing, wiping, ultrasonic deposition, vacuum deposition, vapor deposition, plasma deposition, electrostatic deposition, epitaxial growth, or any other suitable method.

The therapeutically effective amount of bioactive agent that is provided in connection with the various examples ultimately depends upon the condition and severity of the condition to be treated; the type and activity of the specific bioactive agent employed; the method by which the medical device is administered to the patient; the age, body weight, general health, gender and diet of the patient; the time of administration, route of administration, and rate of excretion of the specific compound employed; the duration of the treatment; drugs used in combination or coincidental with the specific compound employed; and like factors well known in the medical arts.

Local administration of bioactive agents may be more effective when carried out over an extended period of time, such as a time period at least matching the normal reaction time of the body to an angioplasty procedure. At the same time, it may be desirable to provide an initial high dose of the bioactive agent over a preliminary period. For example, local administration of a bioactive agent over a period of days or even months may be most effective in treating or inhibiting conditions such as restenosis.

Bioadhesives

In one example, a solution for electrospinning may further comprise a bioadhesive. The bioadhesive may be included in any suitable part of the medical device. In one example, the bioadhesive is coated on the exterior surface of the medical device. Selection of the type of bioadhesive, the portions of the medical device comprising the bioadhesive, and the manner of attaching the bioadhesive to the medical device can be chosen to perform a desired function upon implantation. For example, the bioadhesive can be selected to promote increased affinity of the desired portion of medical device to the section of the body against which it is urged.

Bioadhesives for use in conjunction with the present disclosure include any suitable bioadhesives known to those of ordinary skill in the art. For example, appropriate bioadhesives include, but are not limited to, the following: (1) cyanoacrylates such as ethyl cyanoacrylate, butyl cyanoacrylate, octyl cyanoacrylate, and hexyl cyanoacrylate; (2) fibrinogen, with or without thrombin, fibrin, fibropectin, elastin, and laminin; (3) mussel adhesive protein, chitosan, prolamine gel and transforming growth factor beta(TGF-B); (4) polysaccharides such as acacia, carboxymethyl-cellulose, dextran, hyaluronic acid, hydroxypropyl-cellulose, hydroxypropyl-methylcellulose, karaya gum, pectin, starch, alginates, and tragacanth; (5) polyacrylic acid, polycarbophil, modified hypromellose, gelatin, polyvinyl-pylindone, polyvinylalcohol, polyethylene glycol, polyethylene oxide, aldehyde relative multifunctional chemicals, maleic anhydride co-polymers, and polypeptides; and (6) any bioabsorbable and biostable polymers derivitized with sticky molecules such as arginine, glycine, and aspartic acid, and copolymers.

Furthermore, commercially available bioadhesives that may be used in the present disclosure include, but are not limited to: FOCALSEAL® (biodegradable eosin-PEG-lactide hydrogel requiring photopolymerization with Xenon light wand) produced by Focal; BERIPLAST® produced by Adventis-Bering; VIVOSTAT® produced by ConvaTec (Bristol-Meyers-Squibb); SEALAGEN™ produced by Baxter; FIBRX® (containing virally inactivated human fibrinogen and inhibited-human thrombin) produced by CryoLife; TISSEEL® (fibrin glue composed of plasma derivatives from the last stages in the natural coagulation pathway where soluble fibrinogen is converted into a solid fibrin) and TISSUCOL® produced by Baxter; QUIXIL® (Biological Active Component and Thrombin) produced by Omrix Biopharm; a PEG-collagen conjugate produced by Cohesion (Collagen); HYSTOACRYL® BLUE (ENBUCRILATE) (cyanoacrylate) produced by Davis & Geck; NEXACRYL™ (N-butyl cyanoacrylate), NEXABOND™, NEXABOND™ S/C, and TRAUMASEAL™ (product based on cyanoacrylate) produced by Closure Medical (TriPoint Medical); DERMABOND® which consists of 2-octyl cyanoacrylate produced as DERMABOND® by (Ethicon); TISSUEGLU® produced by Medi-West Pharma; and VETBOND® which consists of n-butyl cyanoacrylate produced by 3M.

Medical Devices

The present disclosure is applicable to implantable or insertable medical devices of any shape or configuration. Typical subjects (also referred to herein as "patients") are vertebrate subjects (i.e., members of the subphylum cordata), including, mammals such as cattle, sheep, pigs, goats, horses, dogs, cats and humans.

Typical sites for placement of the medical devices include the coronary and peripheral vasculature (collectively referred to herein as the vasculature), heart, esophagus, trachea, colon, gastrointestinal tract, biliary tract, urinary tract, bladder, prostate, thorax, brain, wounds and surgical sites.

The medical device may be any device that is introduced temporarily or permanently into the body for the prophylaxis or treatment of a medical condition. For example, such medical devices may include, but are not limited to, stents, stent grafts, vascular grafts, catheters, guide wires, balloons, filters (e.g., vena cava filters), cerebral aneurysm filler coils, intraluminal paving systems, sutures, staples, anastomosis devices, vertebral disks, bone pins, suture anchors, hemostatic barriers, clamps, screws, plates, clips, slings, vascular implants, tissue adhesives and sealants, tissue scaffolds, hernia meshes, skin grafts, myocardial plugs, pacemaker leads, valves (e.g., venous valves), abdominal aortic aneurysm (AAA) grafts, embolic coils, various types of dressings (e.g., wound dressings), bone substitutes, intraluminal devices, vascular supports, or other known bio-compatible devices.

The medical device may be made of one or more suitable biocompatible materials such as stainless steel, nitinol, MP35N, gold, tantalum, platinum or platinum iridium, niobium, tungsten, iconel, ceramic, nickel, titanium, stainless steel/titanium composite, cobalt, chromium, cobalt/chromium alloys, magnesium, aluminum, or other biocompatible metals and/or composites or alloys such as carbon or carbon fiber, cellulose acetate, cellulose nitrate, silicone, cross-linked polyvinyl alcohol (PVA) hydrogel, cross-linked PVA hydrogel foam, polyurethane, polyamide, styrene isobutylene-styrene block copolymer (Kraton), polyethylene teraphthalate, polyurethane, polyamide, polyester, polyorthoester, polyanhydride, polyether sulfone, polycarbonate, polypropylene, high molecular weight polyethylene, polytetrafluoroethylene, or other biocompatible polymeric material, or mixture of copolymers thereof; polyesters such as, polylactic acid, polyglycolic acid or copolymers thereof, a polyanhydride, polycaprolactone, polyhydroxybutyrate valerate or other biodegradable polymer, or mixtures or copolymers thereof; extracellular matrix components, proteins, collagen, fibrin or other therapeutic agent, or mixtures thereof.

It may be advantageous to prepare the surface of a medical device before electrospinning or otherwise depositing a coating thereon. Useful methods of surface preparation may include, but are not limited to: cleaning; physical modifications such as etching, drilling, cutting, or abrasion; chemical modifications such as solvent treatment; application of primer coatings or surfactants; plasma treatment; ion bombardment; and covalent bonding. Such surface preparation may activate the surface and promote the deposition or adhesion of the coating on the surface. Surface preparation may also selectively alter the release rate of a bioactive material. Any additional coating layers may similarly be processed to promote the deposition or adhesion of another layer, to further control the release rate of a bioactive agent, or to otherwise improve the biocompatibility of the surface of the layers. For example, plasma treating an additional coating layer before depositing a bioactive agent thereon may improve the adhesion of the bioactive agent, increase the amount of bioactive agent that can be deposited, and allow the bioactive material to be deposited in a more uniform layer.

A primer layer, or adhesion promotion layer, may be used with the medical device. This layer may include, for example, silane, acrylate polymer/copolymer, acrylate carboxyl and/or hydroxyl copolymer, polyvinylpyrrolidone/vinylacetate copolymer, olefin acrylic acid copolymer, ethylene acrylic acid copolymer, epoxy polymer, polyethylene glycol, polyethylene oxide, polyvinylpyridine copolymers, polyamide polymers/copolymers polyimide polymers/copolymers, ethylene vinylacetate copolymer and/or polyether sulfones.

While various aspects and examples have been described, it will be apparent to those of ordinary skill in the art that many more examples and implementations are possible within the scope of the disclosure. Accordingly, the disclosure is not to be restricted except in light of the attached claims and their equivalents.

We claim:

1. A method for preparing a medical device comprising:

providing a medical device and an electrospinning apparatus;

the medical device defining a lumen with a proximal end, a distal end, a luminal surface, and an abluminal surface;

the electrospinning apparatus comprising a first spinneret and a second spinneret;

the first spinneret comprising a reservoir loaded with a first solution and an orifice, the first spinneret orifice comprising a proximal end fluidly coupled to the reservoir and a distal end through which the first solution is electrospun;

the second spinneret comprising a reservoir loaded with a second solution and an orifice, the second spinneret orifice comprising a proximal end fluidly coupled to the reservoir and a distal end through which the second solution is electrospun;

locating the first spinneret orifice distal end outside of the medical device lumen between the medical device proximal end and the medical device distal end and between about 0.1 inches and about 6.0 inches from the medical device abluminal surface, the first spinneret orifice distal end directly facing the medical device abluminal surface;

locating the second spinneret orifice distal end in the medical device lumen between the medical device proximal end and the medical device distal end and between about 0.1 inches and 2.0 inches from the medical device luminal surface, the second spinneret orifice distal end directly facing the medical device luminal surface;

further locating the first spinneret orifice distal end and the second spinneret orifice distal end opposite one another;

simultaneously electrospinning the first solution onto the medical device abluminal surface and the second solution onto the medical device luminal surface.

2. The method of claim 1 where the electrospinning apparatus further comprises an energy source electrically coupled to the first spinneret and the second spinneret and further comprising applying a first electrical charge with the energy source to the first spinneret and applying a second, opposing electrical charge with the energy source to the second spinneret.

3. The method of claim 1, where the first solution and second solution comprise at least one material selected from the group comprising polymers, proteins, bioadhesives, and bioactive agents.

4. The method of claim 3, where the first solution is different from the second solution.

5. The method of claim 1, further comprising moving the medical device relative the first spinneret orifice distal end or second spinneret orifice distal end and simultaneously electrospinning the first solution about a length or width of the medical device abluminal surface and the second solution about a length or width of the medical device luminal surface.

* * * * *